(12) United States Patent
Lau

(10) Patent No.: US 7,761,059 B2
(45) Date of Patent: Jul. 20, 2010

(54) METHOD OF TRANSMITTING OR RECEIVING WITH CONSTRAINED FEEDBACK INFORMATION

(75) Inventor: Kin Nang Lau, Parsippany, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 726 days.

(21) Appl. No.: 10/445,823

(22) Filed: May 28, 2003

(65) Prior Publication Data
US 2004/0242162 A1 Dec. 2, 2004

(51) Int. Cl.
*H04B 1/00* (2006.01)
(52) U.S. Cl. ............................. 455/69; 455/24; 455/78; 455/126; 455/522; 327/593; 330/75; 370/278; 370/282
(58) Field of Classification Search .................... 455/24, 455/78, 69, 126, 522; 327/593; 330/75; 370/278, 282
See application file for complete search history.

(56) References Cited

U.S. PATENT DOCUMENTS

| | | | |
|---|---|---|---|
| 6,760,882 B1* | 7/2004 | Gesbert et al. ............... 714/774 |
| 6,842,632 B2* | 1/2005 | Raghothaman et al. .. 455/562.1 |
| 6,922,445 B1* | 7/2005 | Sampath et al. ............. 375/267 |
| 7,043,259 B1* | 5/2006 | Trott ........................... 455/458 |
| 2002/0027957 A1* | 3/2002 | Paulraj et al. ................ 375/267 |
| 2002/0034263 A1* | 3/2002 | Schmidl et al. ............. 375/299 |
| 2002/0187753 A1* | 12/2002 | Kim et al. ...................... 455/69 |
| 2002/0193146 A1* | 12/2002 | Wallace et al. .............. 455/562 |
| 2003/0003863 A1* | 1/2003 | Thielecke et al. ............. 455/39 |
| 2003/0220103 A1* | 11/2003 | Kim et al. ................. 455/422.1 |
| 2003/0224750 A1* | 12/2003 | Sampath ................... 455/276.1 |
| 2003/0236080 A1* | 12/2003 | Kadous et al. ............ 455/226.1 |
| 2004/0027994 A1* | 2/2004 | Baines ........................ 370/252 |
| 2006/0018402 A1* | 1/2006 | Mehta et al. ................. 375/299 |

* cited by examiner

*Primary Examiner*—Duc Nguyen
*Assistant Examiner*—Zhiyu Lu
(74) *Attorney, Agent, or Firm*—Harness, Dickey & Pierce

(57) ABSTRACT

A method of transmitting or receiving with constrained feedback information. A transmitter transmits a plurality of transmit signals from at least one transmit antenna. The plurality of transmit signals are based on one or more input signals, one or more power gains, and one or more beamformer matrices. The plurality of transmit signals are received as at least one receive signal, at least one receive antenna of a receiver. The receiver generates the constrained feedback information and transmits the constrained feedback information back to the at least one transmit antenna. The transmitter selects at least one of the power gains and at least one of the beamformer matrices for a subsequent transmission based on the constrained feedback information.

15 Claims, 3 Drawing Sheets

US 7,761,059 B2

METHOD OF TRANSMITTING OR RECEIVING WITH CONSTRAINED FEEDBACK INFORMATION

BACKGROUND OF THE INVENTION

A multi-input, multi-output (MIMO) link refers to a communication system with multiple antennas at a transmitter and a receiver. MIMO links are a known, effective way to increase link capacity, in terms of bits per second per hertz, of wireless links without increasing the bandwidth and power budget. It has been shown that with n_T transmit antennas on a transmit side and n_R antennas on a receive side, the capacity gain is proportional to n=min [n_T,n_R]. The capacity gain results from the formation of MIMO channels and n spatial channels.

There may be at least two benefits from multiple antenna systems; spatial diversity and beamforming. Spatial diversity refers to the ability to collect independent received samples containing the same piece of transmitted information. By combining different independent observations, the effect of channel fading can be reduced. Beamforming is used to steer the antenna pattern so that a strong beam is oriented toward the desired signal and weak beams or even nulls, are formed for interference signals. It has been shown that when complete feedback of the channel state matrix is available to the transmitter, the optimal transmission scheme for a MIMO link is a combined adaptive power control and eigen-beamforming scheme, based on instantaneous channel fading.

However, complete feedback is not easy to achieve especially when the number of transmit and receive antennas is large.

SUMMARY OF THE INVENTION

Exemplary embodiments of the present invention are directed to a method of transmitting or receiving in an at least one-input, at least one-output communication system with constrained feedback information.

In an exemplary embodiment, the present invention is directed to a method of supplying constrained feedback information to a transmitter of an at least one-input, at least one-output communication system, which may include receiving at least one receive signal from at least one transmit antenna at the transmitter, generating the constrained feedback information at a receiver, and transmitting the constrained feedback information back to the transmitter.

In an exemplary embodiment, the present invention is directed to a method of receiving constrained feedback information from at least one receive antenna of a receiver of an at least one-input, at least one-output communication system, which may include transmitting a plurality of transmit signals from at least one transmit antenna of a transmitter, based on a plurality of input signals, a plurality of power gains, and a plurality of beamformer matrices, receiving the constrained feedback information back from the receiver, and selecting at least one of the plurality of power gains and at least one of the plurality of beamformer matrices for a subsequent transmission based on the constrained feedback information.

BRIEF DESCRIPTION OF THE DRAWINGS

Exemplary embodiments of the present invention will become more fully understood from the detailed description given below and the accompanying drawings, which are given for purposes of illustration only, and thus do not limit the invention.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION OF THE EXEMPLARY EMBODIMENTS

Figure 1:
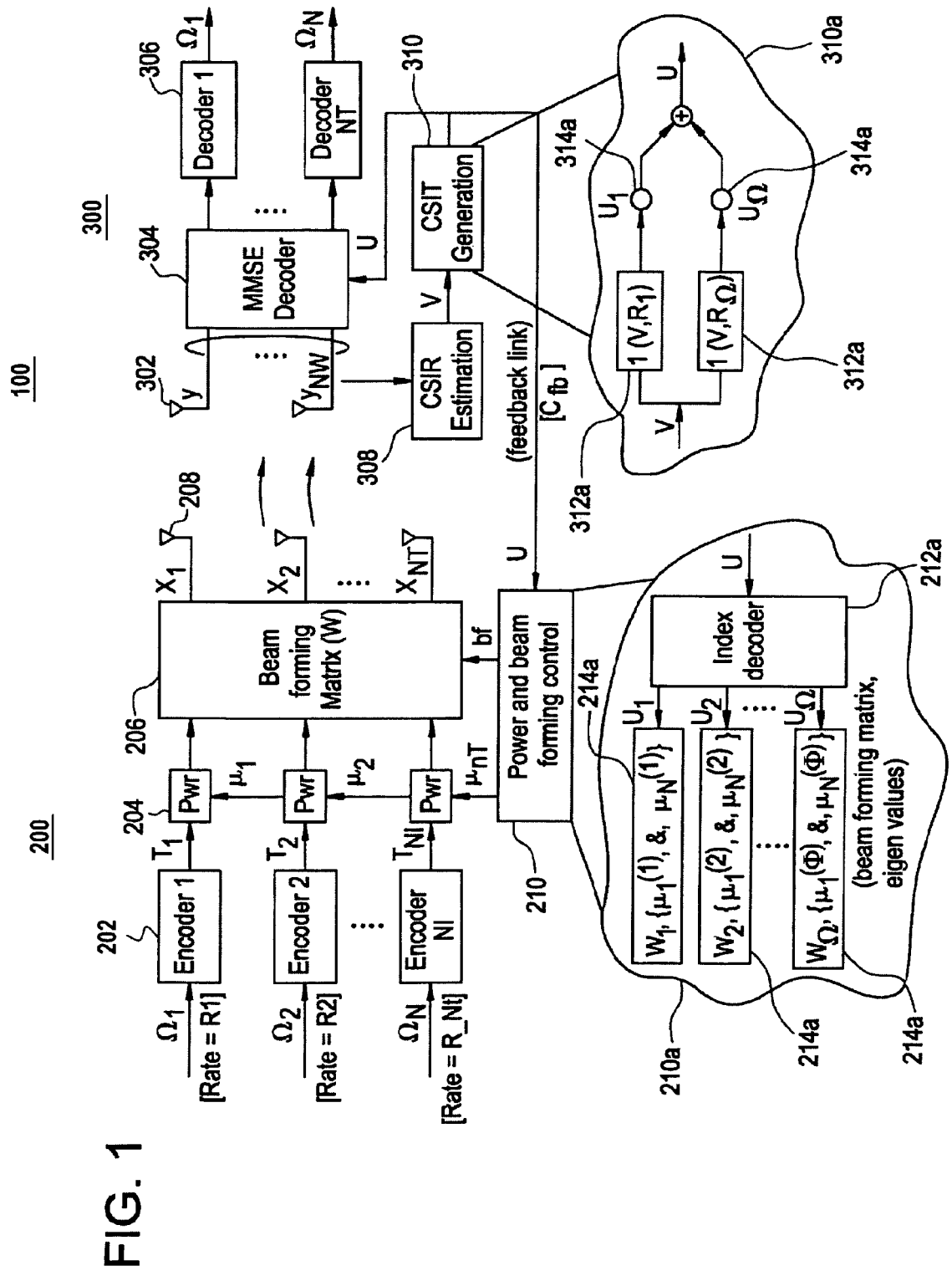
FIG. 1 illustrates a system in accordance with an exemplary embodiment of the present invention.

FIG. 1 illustrates a system 100 in accordance with an exemplary embodiment of the present invention. As shown, the system 100 includes a transmitter 200 and a receiver 300. The transmitter 200 my further include at least one encoder $202_{1 \ldots NI}$, at least one power control block $204_{1 \ldots NT}$, a beamformer 206, at least one transmit antenna $208_{1 \ldots NT}$, and a power and beamforming controller 210.

The receiver 300 may include at least one receive antenna $302_{1 \ldots NR}$, a main decoder 304 (for example, a minimum mean square error decoder (MMSE)), at least one channel decoder $306_{1 \ldots NT}$, a channel state information receive (CSIR) estimator 308, and a channel state information transmit (CSIT) generator 310.

Elements 210a and 310a illustrate exemplary internal operations of the power and beamforming controller 210 and the CSIT generator 310, respectively, and will be discussed in more detail below.

In operation, each of the encoders $202_{1 \ldots NI}$ may receive a stream of channel symbols $\Omega_{1 \ldots N}$, each acting as an independent channel encoder. The output $T_{1 \ldots N}$ of each encoder $202_{1 \ldots NI}$ may be input to at least one power control block $204_{1 \ldots NT}$, which may perform a power adjustment by multiplying the output $T_{1 \ldots N}$ by a power gain $\mu_{1 \ldots NT}$ provided by the power and beamforming controller 210. The power adjusted outputs from the power control blocks $204_{1 \ldots NT}$ may be input to the beamformer 206 along with a beamformer matrix, also supplied by the power and beamforming controller 210. The beamformer 206 may produce transmit signals $X_{1 \ldots NT}$ which may be supplied to the transmit antenna $208_{1 \ldots NT}$.

At the receiver 300, each of the receive antenna $302_{1 \ldots NR}$ may receive a receive signal $Y_{1 \ldots NR}$ and forward the receive signal $Y_{1 \ldots NR}$ to the main decoder 304 and to the CSIR estimator 308. The CSIR estimator 308 may produce an estimation of the channel matrix V, which may be input to the CSIT generator 310. The CSIT generator 310 may produce a feedback signal U, which may be fed back to the main decoder 304 at the receiver 300 and the power and beamforming controller 210 of the transmitter 200. The decoder 304 may produce a stream of symbols $S_{1 \ldots NT}$ which may be input to the channel decoders $306_{1 \ldots NT}$. The channel decoders $306_{1 \ldots NT}$ may output output streams $\Omega_{1 \ldots N}$.

As described above, elements 210a and 310a illustrate exemplary internal operation of the power and beamforming controller 210 and the CSIT generator 310, respectively. In particular, the CSIT generator 310 may receive the channel matrix V from the CSIR estimator 308 and may produce the feedback signal U. As shown in element 310a, the CSIT generator 310 may compare the channel matrix V to one of a plurality of partitions 312a and may select the closest match.

Each of the partitions 312a may have a corresponding partition ID 314a, and the partition ID 314a which corresponds to the best match partition 312a may be output as feedback signal U.

In an exemplary embodiment of the present invention, feedback signal U may be constrained feedback information, for example, feedback signal U may be limited to a certain number of bits, such as four bits, two bits, or even one bit. In an exemplary embodiment of the present invention, element 310a may be defined as a feedback strategy.

The power and beamforming controller 310 may receive the feedback signal U from the CSIT generator 310. Element 210a illustrates exemplary internal operation of the power and beamforming controller 210. In particular, the feedback signal U may be received by an index decoder 212a, which may match the feedback signal U, with the power control gain and beamforming matrix 214a which is the closest match. The closest matching power control gain $\mu_{n_T}$ and beamforming matrix bf may then be supplied to the power control blocks $204_1 \ldots _{NT}$ and the beamformer 206, respectively. In an exemplary embodiment, element 210a is characterized as a transmission strategy. In exemplary embodiments of the present invention, both the feedback strategy in the transmission strategy may be stored in tables on the receiver side and transmit side, respectively.

In an exemplary embodiment, the present invention may be adaptive from frame to frame, and the feedback signal U may be provided only for a given frame and only for a given partition.

With respect to FIG. 1, the $n_R \times n_T$ dimension channel matrix space may be partitioned into Q regions, where each region is labeled $u_q$. $Q = 2^{C_{fb}}$ which is the number of quantization levels allowed in the system 100 and $C_{fb}$ is the maximum number of bits allowed to be fedback as part of feedback signal U per fading block. At any fading block, the actual channel matrix may be estimated at the receiver 300 and the corresponding partition index may be fedback to the transmitter 200. At the transmitter 200, the power control matrix and the beamforming matrix corresponding to the $u_q$ partition index may be used.

In the exemplary embodiment of the FIG. 1, the adaptive power control and beam-forming scheme may be specified by the Q partitions at the channel matrix space at the receiver $[\{V_1, \ldots, V_Q\}]$, and the Q sets of power control matrices $\{\rho_1, \ldots, \rho_Q\}$ (diagonal matrix) and beam forming matrices $\{W_1, \ldots W_Q\}$ at the transmitter.

In an exemplary embodiment of the present invention, an iterative algorithm may be used to find the optimal partition and the optimal power control/beam forming matrices. An exemplary iterative algorithm is set forth below.

Initially, a "distance measure" may be defined as:

$$d(v, \rho_q; w_q) = -\log_2 \left| I + \frac{v^* v w_q \rho_q w_q^*}{\sigma_z^2} \right| + \lambda tr(\rho_q) \qquad (0.1)$$

Further a q-th partition region, $R_q$, may be defined as the region of channel matrix "nearest" to $(\rho_q, w_q)$ where the distance is defined in (0.1).

$$R_q = \{v \in Z^{n_R \times n_T} : d(v, \rho_q, w_q) < d(v, \rho_j, w_j) \forall j \neq q\} \qquad (0.2)$$

A first step of the algorithm may be to obtain Q positive semidefinite matrices $\{b_0, \ldots, b_{Q-1}\}$. This may be accomplished by initializing the $\rho_q$ and $w_q$ by singular value decomposition of $b_q$ where $\rho_q$ is the $n_T \times n_T$ diagonal matrix with diagonal elements corresponding to the $n_T$ eigenvalues of $b_q$; $w_q$ is the $n_T \times n_T$ hermitian matrix corresponding to the eigenmatrix of $b_q$ for all q=[0,Q-1].

As a result, the Q partition regions $\{R_0, \ldots, R_{Q-1}\}$ may be initialized according to (0.2).

A second step of the algorithm may be to evaluate the optimal power control matrix and beam forming matrix from the partition region. The beamforming matrix corresponding to the q-th partition, $w_q$, may be the eigenvector matrix of $$\int_{v \in R_q} [vv^*] f_h(v) dv \text{ for all } q = [0, Q-1].$$

The power control matrix may be a diagonal matrix given by:

$$\rho_q = \left( \frac{I}{\lambda} - \alpha_q \sigma_z^2 \psi^{-1} \right)^+ \qquad (0.3)$$

where ψ is the diagonal matrix corresponding to the eigenvalues of $$\int_{v \in R_q} [vv^*] f_h(v) dv \text{ for all } q = [0, Q-1] \text{ and } \alpha_q = Pr(v \in R_q).$$

A third step of the algorithm may update the partition region $\{R_0, \ldots, R_{Q-1}\}$ according to (0.2). The second step may be repeated until convergence occurs.

The first through third steps may be repeated for other random initializations $\{b_0, \ldots, b_{Q-1}\}$ and results may be chosen that give the maximum capacity.

Figure 2:
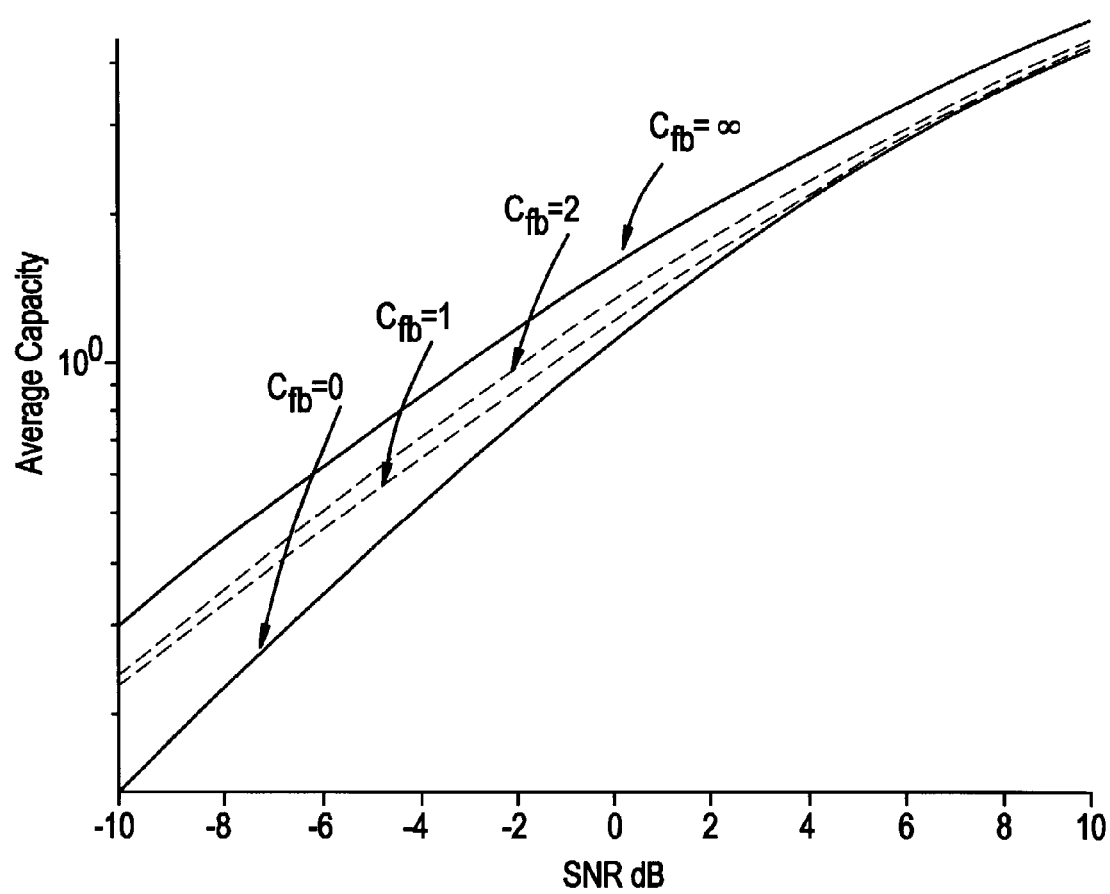
FIG. 2 illustrates the performance of a two transmit antenna, two receive antenna (2×2) system in accordance with an exemplary embodiment of the present invention.
Figure 3:
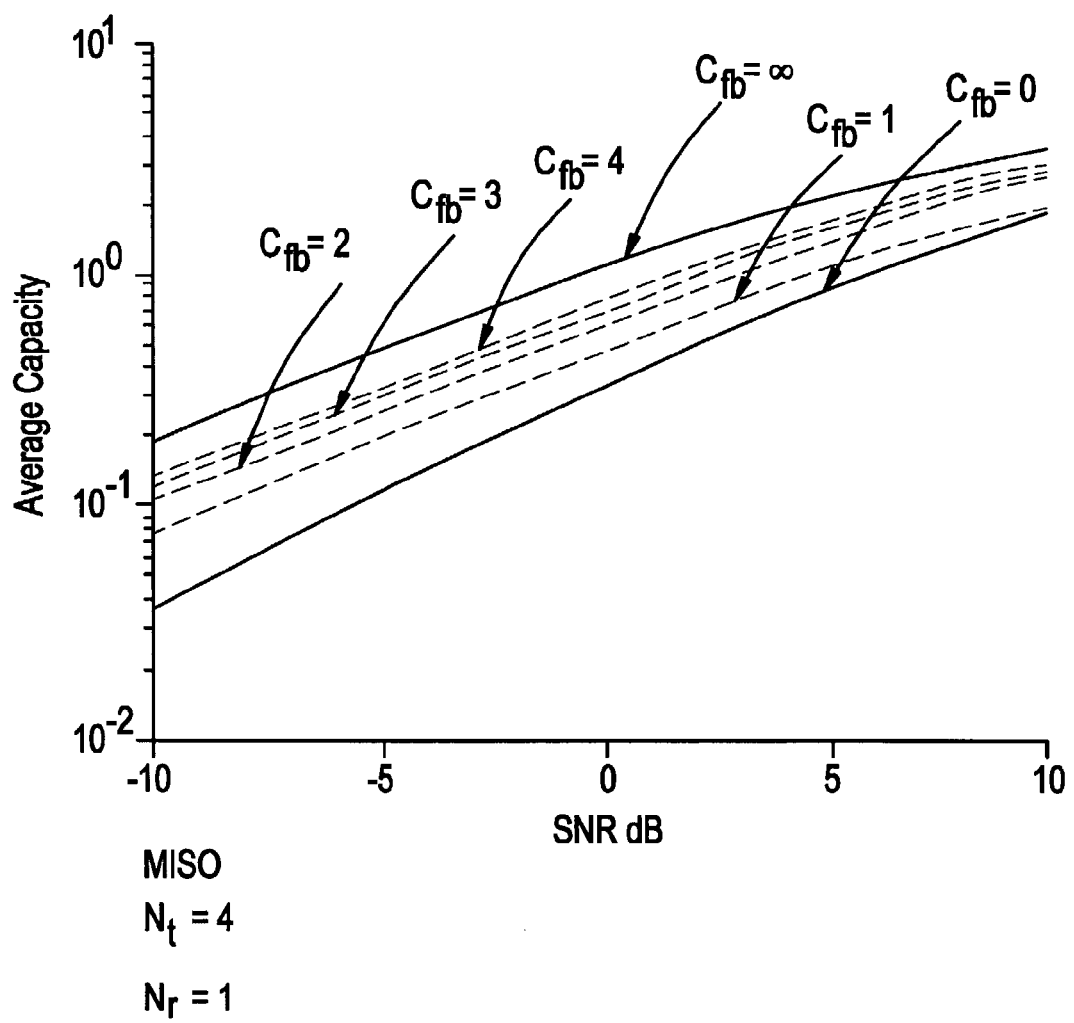
FIG. 3 illustrates the performance of a four transmit antenna, one receive antenna (4×1) system in accordance with an exemplary embodiment of the present invention.

FIGS. 2 and 3 illustrate the performance of the partial feedback design for a two transmit antenna, two receive antenna (2×2) system and a four transmit antenna, one receive antenna (4×1) system (a multiple transmit antenna, single receive antenna is also referred to as a MISO system (multiple-input, single-output)) in accordance with exemplary embodiment of the present invention. As shown in FIGS. 2 and 3, SNR gains are achieved for even C_{fb}=1 bit.

Exemplary embodiments of the present invention may be compatible with fading channels with complex Gaussian channel noise. Exemplary embodiments of the present invention may combine adaptive beamforming and power control schemes to improve or optimize the ergodic capacity of a MIMO or MISO link. Exemplary embodiments of the present invention may be directed to a generic framework for the design of an improved adaptive power control and beam-forming scheme with a feedback capacity constraint. As a result of exemplary embodiments of the present invention, the feedback capacity may be better utilized. Also, exemplary embodiments of the present invention may be used to evaluate how far a given heuristic design is from the optimal performance level.

Exemplary embodiments of the present invention may be useful in wireless infrastructures, such as UMTS or CDMA2000, as well as other wireless systems, such as a wireless LAN.

The invention being thus described, it will be obvious that the same may be varied in many ways. Such variations are not to be regarded as departure from the spirit and scope of the exemplary embodiments of the present invention, and all such modifications are intended to be included within the scope of the following claims.

I claim:

1. A method of supplying constrained feedback information comprising:
   receiving at least one receive signal;
   generating the constrained feedback information including,
      estimating a channel matrix based on the at least one receive signal,
      comparing the estimated channel matrix with at least two partition regions, each partition region being a function of a distance eigenvalue,
      selecting one of the partition regions based on the comparing, and
      setting the constrained feedback information to a partition identifier (ID) of the selected partition region; and
   transmitting the constrained feedback information.

2. The method of claim 1, wherein the at least two partition regions are generated offline or during initialization.

3. The method of claim 1, wherein the at least two partition regions are generated by
   initializing the at least two partition regions,
   evaluating a power control matrix and a beamforming matrix for each of the at least two partition regions,
   updating the at least two partition regions based on the power control matrix and the beamforming matrix,
   repeating the evaluating and updating steps until convergence of an optimal partition region is achieved, and
   repeating the initialization, evaluating and updating steps until a global maximum is obtained.

4. The method of claim 1, wherein the at least two partition regions, a plurality of power gains, a plurality of beamformer matrices, and relationships therebetween are generated offline or during initialization.

5. The method of claim 4, wherein the at least two partition regions are generated based on a feedback strategy, and the relationships between the at least two partition regions and the corresponding power gain and beamformer matrix are maintained at a transmitter as a transmission strategy.

6. The method of claim 5, wherein the transmission strategy is stored in a table on a transmission side and the feedback strategy is stored in a table on a receiver side.

7. The method of claim 1, wherein the communication system comprises a point-to-point multi-input multi-output (MIMO) architecture.

8. The method of claim 1, wherein the communication system comprises at least one of a point-to-point multi-input single-output (MISO) and a point-to-point single-input multiple-output (SIMO) architecture.

9. A method of transmitting a feedback signal from a transceiver, comprising:
   estimating a channel matrix of at least one received signal;
   decomposing the estimated channel matrix into a plurality of partition regions, each partition region being a function of a distance eigenvalue, and each partition region having a corresponding partition identifier (ID);
   comparing the estimated channel matrix to at least a portion of the plurality of partition regions;
   selecting an optimal partition region for the estimated channel matrix based on the compared portion of the plurality of partition regions; and
   transmitting the selected partition identifier as the feedback signal.

10. The method of claim 9, further comprising:
    constraining the feedback signal.

11. The method of claim 9, wherein the comparing step, further includes:
    evaluating a power control matrix and a beamforming matrix for each of the at least a portion of the plurality of partition regions.

12. The method of claim 11, wherein the step, further includes:
    iteratively processing the at least a portion of the plurality of partition regions to determine the optimal partition region.

13. The method of claim 9, further comprising:
    generating the plurality of partition regions offline.

14. The method of claim 9, wherein the plurality of partition regions are a function of a feedback strategy.

15. The method of claim 9, wherein the transceiver is part of a communication system including at least one point-to-point multi-input multi-output (MIMO) architecture and a point-to-point single-input multi-output (SIMO) architecture.

* * * * *